United States Patent
Shapiro

(10) Patent No.: US 10,558,387 B2
(45) Date of Patent: Feb. 11, 2020

(54) METHOD AND SYSTEM FOR OPTIMISTIC FLOW CONTROL FOR PUSH-BASED INPUT/OUTPUT WITH BUFFER STEALING

(71) Applicant: EMC IP Holding Company LLC, Hopkinton, MA (US)

(72) Inventor: Michael W. Shapiro, San Francisco, CA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 16/277,507

(22) Filed: Feb. 15, 2019

(65) Prior Publication Data

US 2019/0250846 A1    Aug. 15, 2019

Related U.S. Application Data

(63) Continuation of application No. 15/087,727, filed on Mar. 31, 2016, now Pat. No. 10,254,999.

(51) Int. Cl.
*G06F 3/06* (2006.01)
*G06F 12/00* (2006.01)

(52) U.S. Cl.
CPC ............ *G06F 3/0656* (2013.01); *G06F 3/061* (2013.01); *G06F 3/0608* (2013.01); *G06F 3/0673* (2013.01); *G06F 3/0683* (2013.01)

(58) Field of Classification Search
CPC ........ G06F 12/00; G06F 13/00; G06F 3/0656; G06F 3/0683; G06F 3/0608; G06F 3/061
USPC .................................................. 711/100, 154
See application file for complete search history.

(56) References Cited

U.S. PATENT DOCUMENTS

| 6,038,619 A | 3/2000 | Berning |
| 6,115,793 A * | 9/2000 | Gruber ................ G06F 12/0864 711/133 |
| 6,668,304 B1 * | 12/2003 | Satran ................. G06F 11/1474 709/231 |
| 2002/0083244 A1 | 6/2002 | Hammarlund |
| 2002/0188801 A1 | 12/2002 | Green |
| 2005/0223154 A1 * | 10/2005 | Uemura .............. G06F 12/0223 711/4 |
| 2007/0038797 A1 * | 2/2007 | McBride ............. G06F 12/0891 711/3 |

(Continued)

FOREIGN PATENT DOCUMENTS

| CN | 1862475 A | 11/2006 |
| CN | 101539842 A | 9/2009 |

(Continued)

OTHER PUBLICATIONS

"PCI-SIG SR-IOV Primer" Revision 2.5, An Introduction to SR-IOV Technology, Intel LAN Access Division Jan. 2011 (28 pages).

(Continued)

*Primary Examiner* — Tuan V Thai
(74) *Attorney, Agent, or Firm* — Chamberlain, Hrdlicka, White, Williams & Aughtry

(57) ABSTRACT

In general, embodiments of the technology relate to writing data to storage appliances. More specifically, embodiments of the technology are directed to writing data to storage media using a push-based mechanism in which clients provide the data to write to the storage media and then subsequently provide a command to write the data to the storage media.

20 Claims, 12 Drawing Sheets

(56) References Cited

U.S. PATENT DOCUMENTS

| | | |
|---|---|---|
| 2010/0146068 A1 | 6/2010 | Haviv |
| 2011/0179414 A1 | 7/2011 | Goggin |
| 2015/0058533 A1 | 2/2015 | El-Batal |
| 2015/0067233 A1 | 3/2015 | Cheng |
| 2016/0085684 A1 | 3/2016 | Borikar |
| 2018/0018258 A1 | 1/2018 | Nalli |

FOREIGN PATENT DOCUMENTS

| | | |
|---|---|---|
| CN | 104049918 A | 9/2014 |
| CN | 104423894 A | 3/2015 |

OTHER PUBLICATIONS

"Single Root I/O Visualization and Sharing Specification", Revision 1.0. Sep. 11, 2007, PCI-SIG (84 pages).

"Address Translation Services", Revision 1.1, PCI Express, Jan. 26, 2009 (54 pages).

First Office Action issued in corresponding Chinese Application No. 201610498701.1, dated Sep. 2, 2019.

\* cited by examiner

Physical Buffer State Diagram

METHOD AND SYSTEM FOR OPTIMISTIC FLOW CONTROL FOR PUSH-BASED INPUT/OUTPUT WITH BUFFER STEALING

BACKGROUND

Storage appliances include storage media and provide a mechanism to enable clients to write data to and to read data from the storage media.

DETAILED DESCRIPTION

Figure 1A:
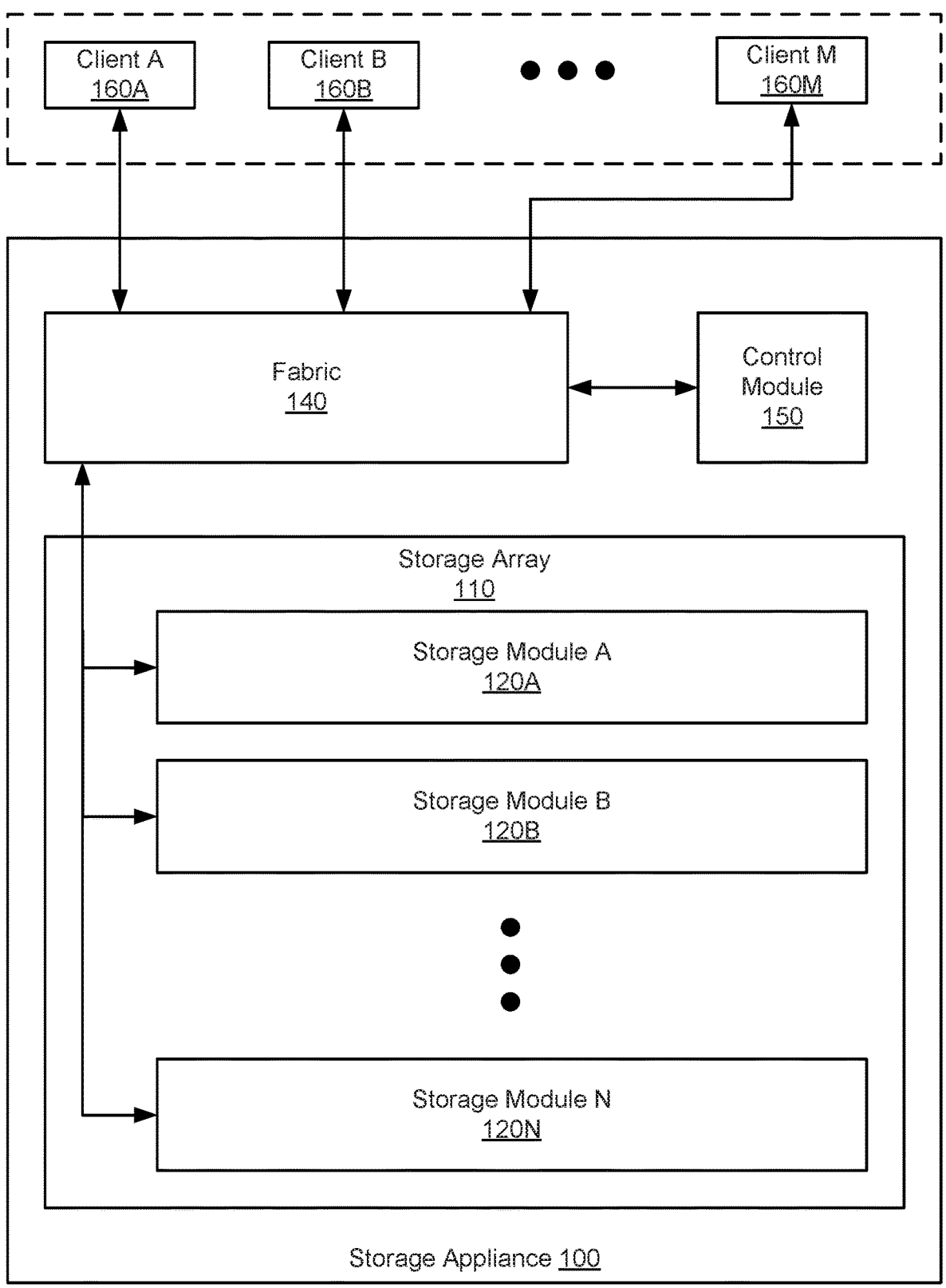
FIGS. 1A-1C show systems in accordance with one or more embodiments of the technology.

Specific embodiments of the technology will now be described in detail with reference to the accompanying figures. Like elements in the various figures are denoted by like reference numerals for consistency.

In the following detailed description of embodiments of the technology, numerous specific details are set forth in order to provide a more thorough understanding of the technology. However, it will be apparent to one of ordinary skill in the art that the technology may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In the following description of FIGS. 1A-7D, any component described with regard to a figure, in various embodiments of the technology, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the technology, any description of the components of a figure is to be interpreted as an optional embodiment which may be implemented in addition to, in conjunction with, or in place of the embodiments described with regard to a corresponding like-named component in any other figure.

In general, embodiments of the technology relate to writing data to storage appliances. More specifically, embodiments of the technology are directed to writing data to storage media using a push-based mechanism in which clients provide the data to write to the storage media and then subsequently provide a command to write the data to the storage media. Embodiments of the technology further enable the aforementioned write mechanism using a shared physical buffer pool, where the allocation of the physical buffer locations in the physical buffer pool is abstracted (or otherwise not visible) to the clients. Further, embodiments of the technology provide a mechanism to manage the usage of the physical buffer locations in the physical buffer pool in order to enable the clients to share the physical buffer location in an efficient manner.

Figure 1B:
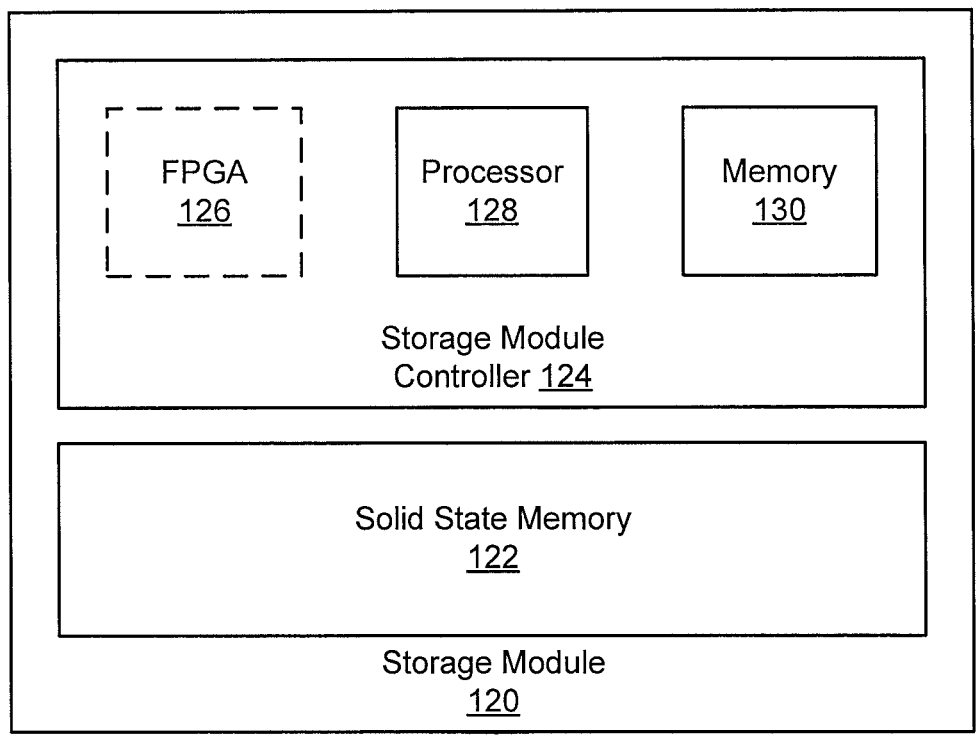

FIGS. 1A and 1B show systems in accordance with one or more embodiments of the technology. Referring to FIG. 1A, the system includes one or more clients (client A (160A)-client M (160M)) that are operatively connected to a storage appliance (100).

In one embodiment of the technology, the clients (160A-160M) may be any type of physical system that includes functionality to issue a read request to the storage appliance (100) and/or to issue a write request to the storage appliance (100). Though not shown in FIG. 1A, each of the clients (160A-160M) may include a client processor (not shown), client memory (not shown), and any other software and/or hardware necessary to implement one or more embodiments of the technology including, but not limited to, the embodiments described in FIGS. 4A and 4B.

In one embodiment of the technology, the clients (160A-160M) are configured to execute an operating system (OS) that includes a file system. The file system provides a mechanism for the storage and retrieval of files from the storage appliance (100). More specifically, the file system includes functionality to perform the necessary actions to issue read requests and write requests to the storage appliance (100). The file system may also provide programming interfaces to enable the creation and deletion of files, reading and writing of files, performing seeks within a file, creating and deleting directories, managing directory contents, etc. In addition, the file system also provides management interfaces to create and delete file systems. In one embodiment of the technology, to access a file, the operating system (via the file system) typically provides file manipulation interfaces to open, close, read, and write the data within each file and/or to manipulate the corresponding metadata. In another embodiment of the technology, the client is configured to execute a block driver that is used to access the storage appliance. In another embodiment of the technology, the client is configured to execute an application programming interface (API) that enables the client to access the storage appliance.

In one embodiment of the technology, the clients (160A-160M) interface with the fabric (140) of the storage appliance (100) to communicate with the storage appliance (100), as further described below.

In one embodiment of the technology, the storage appliance (100) is a system that includes persistent storage such as solid state memory, and is configured to service read requests and/or write requests from one or more clients (160A-160M).

The storage appliance (100), in accordance with one or more embodiments of the technology, includes one or more storage modules (120A-120N) organized in a storage array (110), a control module (150), and a fabric (140) that interfaces the storage module(s) (120A-120N) with the clients (160A-160M) and the control module (150). Each of these components is described below.

The storage array (110), in accordance with an embodiment of the technology, accommodates one or more storage modules (120A-120N). The storage array may enable a modular configuration of the storage appliance, where storage modules may be added to or removed from the storage appliance (100), as needed or desired. A storage module (120), in accordance with an embodiment of the technology, is described below, with reference to FIG. 1B.

Continuing with the discussion of the storage appliance (100), the storage appliance includes the fabric (140). The fabric (140) may provide physical connectivity between the clients (160A-160M), the storage module(s) (120A-120N) and the control module (150) using one or more of the following communication protocols: Peripheral Component Interconnect (PCI), PCI-Express (PCIe), PCI-eXtended (PCI-X), Remote Direct Memory Access (RDMA) over converged Ethernet (RoCE), Non-Volatile Memory Express (NVMe), Non-Volatile Memory Express (NVMe) over a PCI-Express fabric, Non-Volatile Memory Express (NVMe) over an Ethernet fabric, and Non-Volatile Memory Express (NVMe) over an Infiniband fabric, or any other protocol that implements or otherwise supports a push-based write mechanism as described below in, e.g., FIGS. 4A-4B. Those skilled in the art will appreciate that the technology is not limited to the aforementioned protocols.

Figure 3:
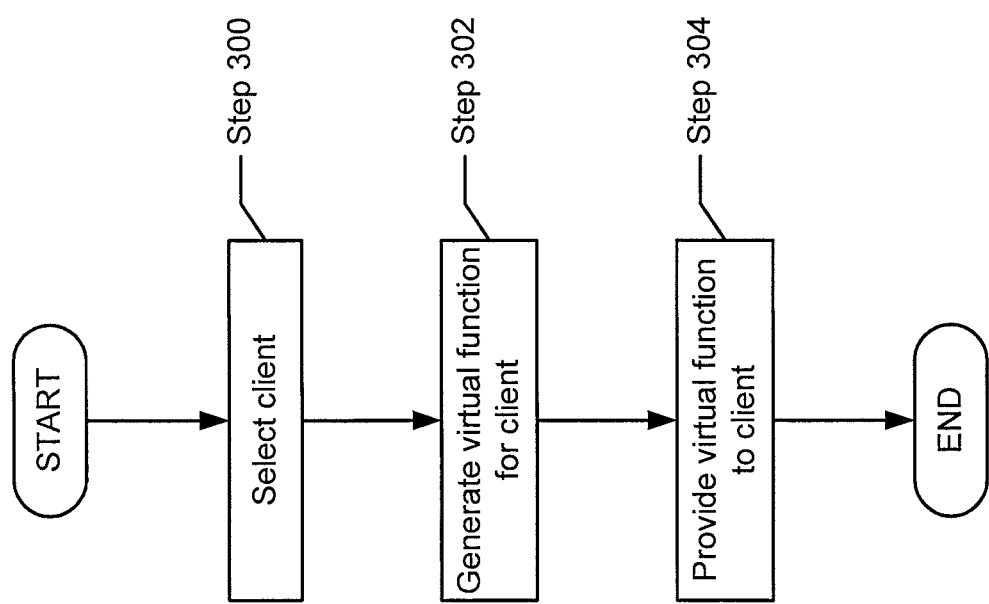
FIGS. 3-6 show flowcharts in accordance with one or more embodiments of the technology.

Further, in one or more embodiments of the technology, the storage appliance (100) includes the control module (150). In general, the control module (150) is a hardware module that may be configured to perform all or a portion of the functions described in FIG. 3. More specifically, in one embodiment of the technology, the control module may include a processor (not shown) (e.g., one or more cores, or micro-cores of a processor that are configured to execute instructions), one or more hardware registers (not shown), and memory (not shown) (e.g., volatile memory that may be, but is not limited to, dynamic random-access memory (DRAM), synchronous DRAM, SDR SDRAM, and DDR SDRAM). Some or all of the aforementioned components may be used to implemented the functionality described in FIG. 3. In another embodiment of the technology, the control module does not perform any portion of the functionality described in FIG. 3; instead the functionality described in FIG. 3 is performed by the individual storage modules.

In one embodiment of the technology, the control module (150) interfaces with the fabric (140) in order to communicate with the storage module(s) (120A-120N) and/or the clients (160A-160M). The control module may support one or more of the following communication protocols: Peripheral Component Interconnect (PCI), PCI-Express (PCIe), PCI-eXtended (PCI-X), Remote Direct Memory Access (RDMA) over converged Ethernet (RoCE), Non-Volatile Memory Express (NVMe), Non-Volatile Memory Express (NVMe) over a PCI-Express fabric, Non-Volatile Memory Express (NVMe) over an Ethernet fabric, and Non-Volatile Memory Express (NVMe) over an Infiniband fabric, any other protocol that implements or otherwise supports a push-based write mechanism as described below in, e.g., FIGS. 5 and 6, and/or any other communication standard necessary to interface with the fabric (140). Those skilled in the art will appreciate that the technology is not limited to the aforementioned protocols. Additional details about the control module are provided in FIG. 1C below.

FIG. 1B shows a storage module, in accordance with one or more embodiments of the technology. The storage module (120) includes solid-state memory (122) to persistently store data. In one embodiment of the technology, the solid-state memory (122) of the storage module (120) may include, but is not limited to, Spin-Torque Magnetic RAM (ST-MRAM), Phase Change Memory (PCM), NAND Flash memory and NOR Flash memory. Further, the NAND Flash memory and the NOR flash memory may include single-level cells (SLCs), multi-level cell (MLCs), or triple-level cells (TLCs). Generally, the solid state memory (122) may correspond to any type of memory that has a finite number of program-erase cycles. Those skilled in the art will appreciate that the technology is not limited to the solid state memory; rather, embodiments of the technology may implemented using any type of persistent storage.

Continuing with the discussion of the storage module (120), shown in FIG. 1B, the storage module (120), in accordance with one or more embodiments of the technology, further includes a storage module controller (124). In one embodiment of the technology, the storage module controller (124) is configured to receive and service requests to read from and/or write data to the solid state memory (122). These requests may originate from the clients (160A-160M) or control module (150) and may be conveyed to the storage module controller (124) via the fabric (140).

In one embodiment of the technology, the storage module controller (124) includes a processor (128) (e.g., one or more cores, or micro-cores of a processor that are configured to execute instructions), and memory (130) (e.g., volatile memory that may be, but is not limited to, dynamic random-access memory (DRAM), synchronous DRAM, SDR SDRAM, and DDR SDRAM). In one embodiment of the technology, the storage module controller includes functionality to perform all or a portion of the functionality described in FIGS. 3, 5, and 6. Alternatively or additionally, the storage module controller (124) may include a field-programmable gate array (FPGA) (and/or an application-specific integrated circuit (ASIC)) (126). In a storage module controller that includes an FPGA (and/or ASIC) and a processor, the FPGA and/or ASIC may perform all or a portion of FIGS. 3, 5, and 6.

Figure 1C:
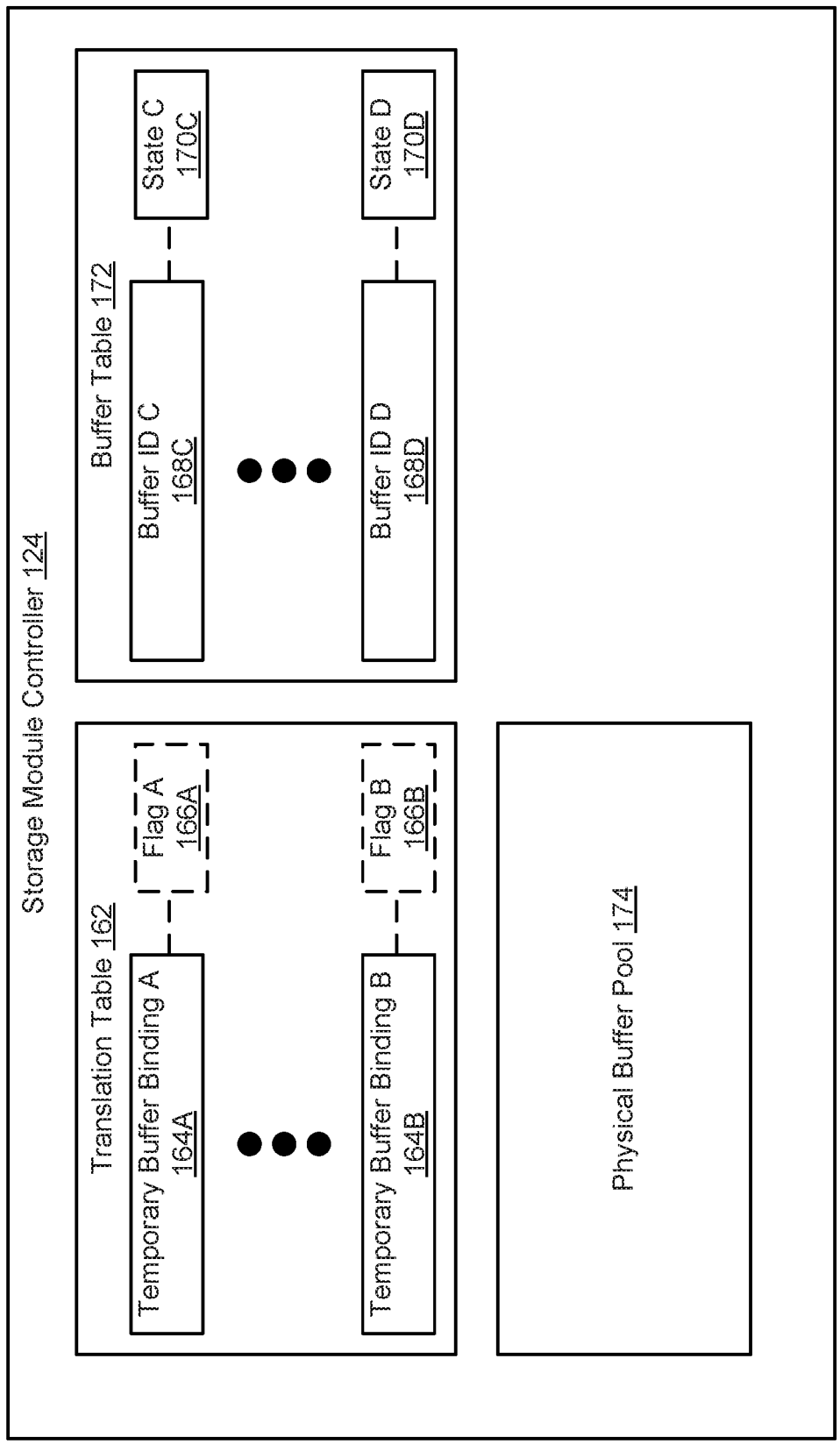

FIG. 1C shows additional detail about storage module controller in accordance with one or more embodiments of the technology. More specifically, FIG. 1C shows various components and/or tables that are part of and/or stored in the storage module controller. To avoid unnecessarily complicating FIG. 1C, other components of the storage module controller (described above) are intentionally omitted from FIG. 1C.

Turning to FIG. 1C, the storage module controller includes a translation table (162), a buffer table (172), and a physical buffer pool (174). Each of these components is described below.

In one embodiment of the technology, the physical buffer pool (174) corresponds to a set of physical buffer locations, which have been allocated by the storage module controller to store client data (i.e., data provided by the client to the storage appliance). The physical buffer locations may correspond to regions in the memory (not shown) of the storage module controller. Each of the physical buffer locations may be associated with a physical address.

In one embodiment of the technology, the buffer table (172) tracks the state (described in FIG. 2) of each of the physical buffer locations in the physical buffer pool (172). The buffer table (172) may include a set of entries, where each entry includes a buffer ID (168C, 168D) that uniquely identifies the physical buffer location and the current state (170C, 170D) of the physical buffer location. The buffer ID may be, for example, a physical address corresponding to the physical buffer location; however, identifiers may be used without departing from the technology.

In one embodiment of the technology, the translation table (162) provides a mapping between virtual buffer locations and physical buffer locations. The physical buffer location corresponds to the actual location in the physical buffer pool in which the client data is stored. In contrast, a virtual buffer location is, from the perspective of the client, the physical buffer location in which the client data is stored. The aforementioned mappings are stored as temporary buffer bindings (164A, 164B). A temporary buffer binding may include a virtual address corresponding to the virtual buffer location and physical address corresponding to the physical buffer location. The temporary buffer binding may include information other that virtual address and physical addresses to represent the virtual buffer location and the physical buffer location, respectively, without departing from the technology. In one embodiment of the technology, a temporary buffer binding may be formed by the client using an addressing mechanism appropriate to the fabric used to connect clients to the storage appliance. Accordingly, the temporary buffer bindings might be provided as physical addresses, virtual addresses, and/or RDMA memory keys and offsets depending on the fabric being used. The technology is not limited to the aforementioned types of addresses or keys.

Further, each temporary buffer binding (164A, 164B) may include (or otherwise be associated with) a flag (166A, 166B). The flag indicates whether the temporary buffer binding is valid. In one embodiment of the technology, the flag (166A, 166B) is initially not set (indicating that the buffer binding is valid); however, the flag for a given temporary buffer binding may be set when the temporary buffer binding is no longer valid (see e.g., FIG. 5). Each temporary buffer binding may also be associated with other information such as, but not limited to, when the temporary buffer binding was created.

One skilled in the art will recognize that the architecture of the system is not limited to the components shown in FIGS. 1A-1C. For example, the components of the storage appliance (100) may include any number of storage modules (120A-120N). Further, the storage module controller (124) of the storage module (120) and the control module (150) of the storage appliance (100) may be equipped with central processing units (CPUs), field-programmable gate arrays (FPGAs), application-specific integrated circuits (ASICs) and/or any other type of processor, without departing from the technology. In addition, the fabric may be based on communication standards other than those discussed above, without departing from the technology.

Figure 2:
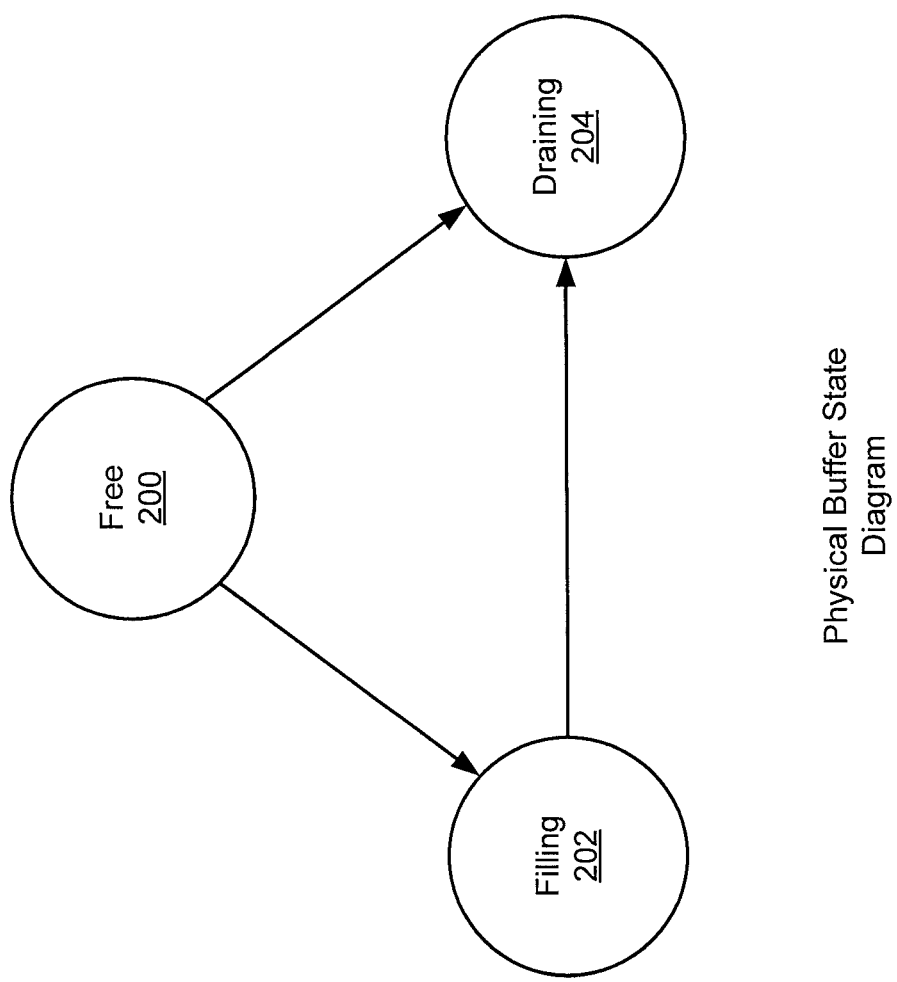
FIG. 2 shows a state transition diagram for physical buffer locations in accordance with one or more embodiments of the technology.

FIG. 2 shows a state transition diagram for physical buffer locations in accordance with one or more embodiments of the technology. When the physical buffer location has not been allocated and/or there translation table does not include a corresponding temporary buffer binding for the physical buffer location, then the state of the physical buffer location is free (200). When the physical buffer location has been allocated and/or there translation table includes a corresponding temporary buffer binding for the physical buffer location, then the state of the physical buffer location is allocated (202). When a command packet is received for the physical buffer location and/or when the data that is stored in the physical buffer location is being written to the storage module, then the state of the physical buffer location is draining (204). After the data that is stored in the physical buffer location has been stored in the storage module, the state of the physical buffer location is set to free (200).

Those skilled in the art will appreciate that technology is not limited to the three states shown in FIG. 2; rather, the technology may be implemented using a different state transition diagram without departing from the technology.

FIGS. 3-6 show flowcharts in accordance with one or more embodiments of the technology.

While the various steps in the flowcharts are presented and described sequentially, one of ordinary skill will appreciate that some or all of these steps may be executed in different orders, may be combined or omitted, and some or all of the steps may be executed in parallel. In one embodiment of the technology, the steps shown in FIGS. 3-6 may be performed in parallel with any other steps shown in FIGS. 3-6 without departing from the technology.

FIG. 3 shows a method for creating a virtual buffer pool for a client by the storage appliance in accordance with one or more embodiments of the technology.

In Step 300, the control module selects a client for which to generate a virtual buffer pool. Step 300 may be initiated by a client and/or by the storage appliance.

In Step 302, the control module generates a virtual function for the selected client, where the virtual function corresponds to a virtual buffer pool that the storage module is allocating to the client. More specifically, the virtual function specifies (or may be used to determine) the virtual addresses associated with the virtual buffer pool allocated to the client. In one embodiment of the technology, the virtual buffer pool corresponds to set of virtual buffer location that, from the perspective of the client, are actual physical buffer locations. The size of the virtual buffer pool allocated to a given client may be determined by the client, the storage appliance, or any combination thereof.

In one embodiment of the technology, the size of the virtual buffer pool for any individual client is typically not greater than the size of the physical buffer pool. However, the aggregate size of all virtual buffer pools is typically greater than the size of the physical buffer pool. For example, the physical buffer pool may be 5 GB and each client may be assigned a 5 GB virtual buffer pool. In such a scenario, if there are five clients, then the aggregate size of the virtual buffer pools is 25 GB (i.e., five times the size of the physical buffer pool).

Continuing with the discussion of FIG. 3, in Step 304, the virtual function is provided to the client. In one embodiment of the technology, information about the virtual buffer pool allocated to a client may be conveyed to the client using a mechanism other than a virtual function without departing from the technology.

The process described in FIG. 3 may be performed for each client prior to the client attempting to write data to the storage modules. While FIG. 3 has been described as being performed by the control module, FIG. 3 may be performed by a storage module controller without departing from the technology.

In one embodiment of the technology, from the perspective of the client, the virtual buffer pool is a physical buffer pool that is specifically allocated to the client. Accordingly, the client interacts with the virtual buffer pool as if it a physical buffer pool to which only the client has access. In this manner, the client is able (e.g., via the method shown in FIGS. 4A, 4B) to write data to the storage modules using a push mechanism without having to take into account if another client is attempting to write to the same buffer location. Further, in various embodiments of the technology, the client tracks the state of each of the virtual buffer locations in the virtual buffer pool. In such cases, the state of a given virtual buffer location may be free (or unallocated) or allocated (see e.g., FIGS. 7A-7D).

Figures 4A, 4B:
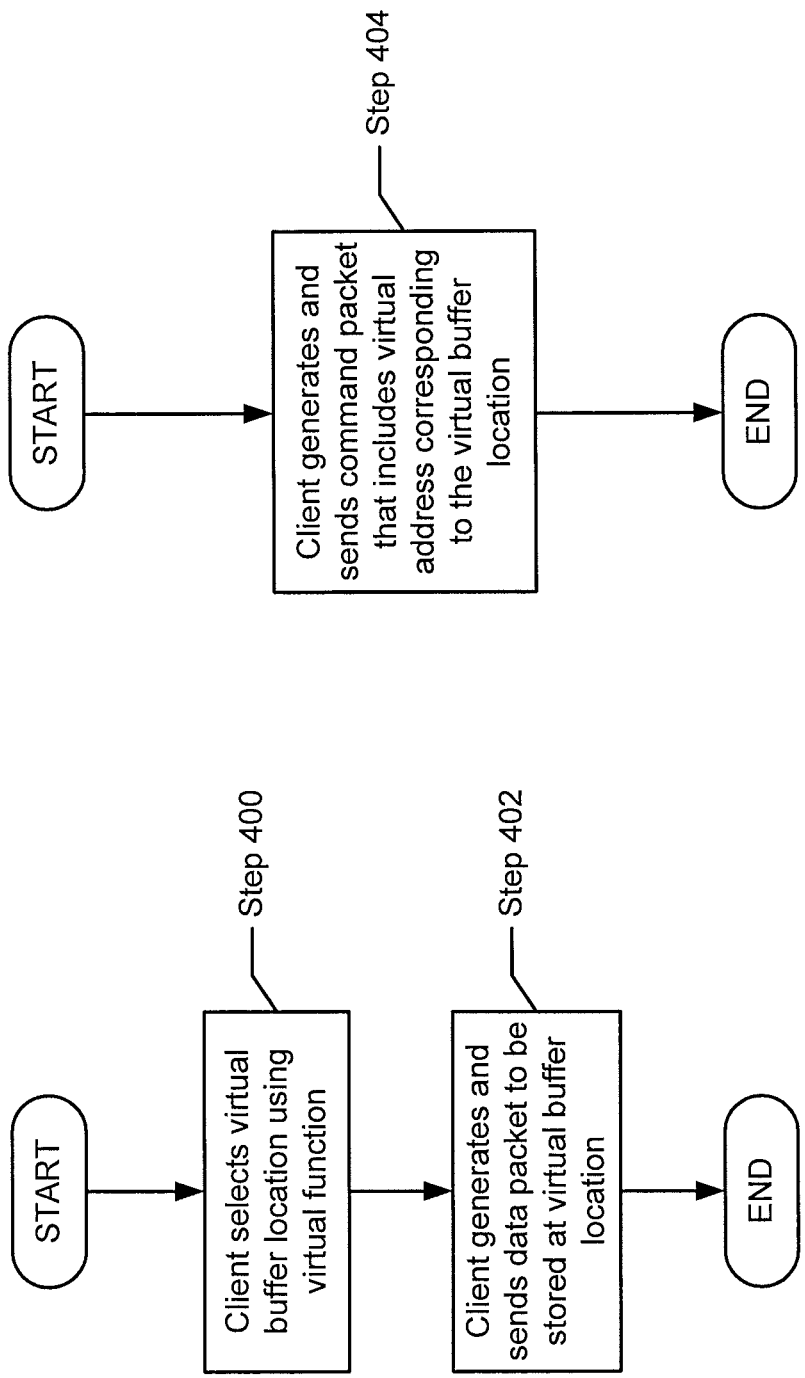

FIG. 4A shows a method for generating and issuing a data packet to the storage appliance in accordance with one or more embodiments of the technology.

In step 400, the client initiates a push-based write to the storage appliance by selecting a virtual buffer location (which from the perspective of the client is a physical buffer location) in the virtual buffer pool to which to write data. The selection of the virtual buffer location may be performed using a virtual function, which ultimately generates a virtual address corresponding to a virtual buffer location. The client may use any other mechanism to select the virtual buffer location without departing from the technology.

In step 402, a data packet is generated that includes the data to the written to the storage module and the virtual address determined in step 400. Once the data packet has been generated, the data packet is transmitted over the fabric. Upon receipt of the data packet by the fabric, the fabric routes the data packet to the storage module controller. The data packet is subsequently processed in accordance with FIG. 5 (described below).

If the data to the written to the storage appliance has a size greater than the maximum transmission unit (MTU) of the packet, then multiple data packets may be generated where each of the data packets includes the virtual address and a portion of the total data to be written to the storage appliance. In this manner, data packets for a given write operation are associated with the same virtual address and ultimately stored in the same physical buffer location in the storage module controller. Accordingly, step 402 may be performed for each such data packet that is generated.

FIG. 4B shows a method for generating and issuing a command packet to the storage appliance in accordance with one or more embodiments of the technology.

In step 404, after all data packets associated with the write operation have been generated and transmitted to the fabric, the client generates a command packet that includes the write command (or an equivalent command) and a virtual address (i.e., a virtual address determined in step 400). Once the command packet is generated, it is transmitted to the fabric. Upon receipt of the command packet by the fabric, the fabric routes the command packet to the storage module controller. The command packet is subsequently processed in accordance with FIG. 6 (described below).

Figure 5:
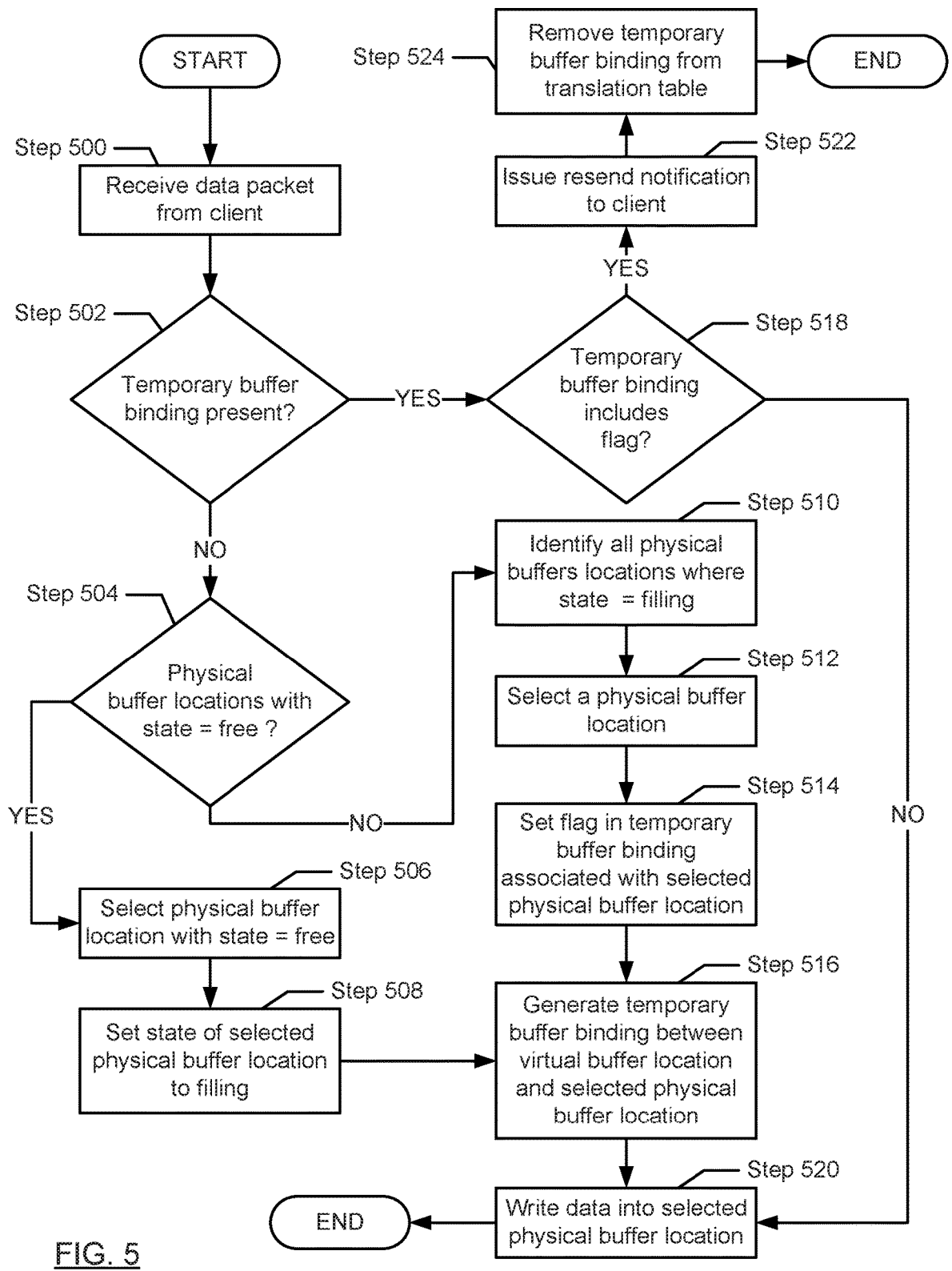

FIG. 5 shows a method for processing data packets received by the storage module controller in the storage appliance in accordance with one or more embodiments of the technology.

In step 500, a data packet is received by the storage module controller, where the data packet includes a virtual address (or other information that corresponds to a virtual buffer location) and data to be stored at a virtual buffer location corresponding to the virtual address.

In step 502, a determination is made about whether the translation table includes a temporary buffer binding that specifies the virtual address (or other information that corresponds to a virtual buffer location). If the translation table includes such a temporary buffer binding, the process proceeds to Step 518; otherwise the process proceeds to step 504.

In step 504, when the translation table does not include a temporary buffer binding that specifies the virtual address (or other information that corresponds to a virtual buffer location), a determination is made about whether there are physical buffer locations with a state of free. The determination in Step 504 may be performed using the buffer table. If there are physical buffer locations with a state of free, the process proceeds to step 506; otherwise, the process proceeds to step 510.

In step 506, when there are physical buffer locations with a state of free, one of the physical buffer locations with a state of free is selected.

In step 508, the state of the physical buffer location is set to filling in the buffer table. The process then proceeds to Step 516.

In step 510, when there are no physical buffer locations with a state of free, then all physical buffer locations with a state of filling are identified using, for example, the buffer table.

In step 512, a physical buffer location is selected from the physical buffer locations identified in step 510. The selection of the physical buffer location in step 512 may be performed using one or more selection criterion. For example, the physical buffer location may be selected randomly. In another example, the selected physical buffer location may correspond to the physical buffer location that is associated with the oldest temporary buffer binding. In another example, the selected physical buffer location may be storing data associated with a client where the client has the lowest negotiated quality of service (QoS) relative to all other clients that are currently writing or attempting to write data to the storage module. The technology is not limited to the aforementioned examples.

In step 514, a flag is set in the temporary buffer binding associated with the physical buffer location selected in step 512 to indicate that the temporary buffer binding is invalid (or no longer valid).

In step 516, a temporary buffer binding is generated, which maps the virtual buffer location (which may be identified by the virtual address in the data packet) to the physical buffer location (which may be identified using a physical address), where the physical buffer location corresponds to the physical buffer location selected in step 506 or step 512. The process then proceeds to step 520.

In step 518, when the translation table includes a temporary buffer binding that specifies the virtual address (or other information that corresponds to a virtual buffer location) (as determined in step 502), a determination is made about whether the temporary buffer binding is valid. The aforementioned determination may be made by determining whether there is a flag set for the temporary buffer binding. If the temporary buffer binding is valid, the process proceeds to step 520; otherwise, the process proceeds to Step 522.

In step 520, the data in the data packet (i.e., the data packet received in Step 500) is written to the physical buffer location as specified in temporary buffer binding generated in Step 516 or identified in step 502. The process then ends.

In one embodiment of the technology, when the process arrives at step 520 via steps 510-516, any data that is present in the physical buffer location is removed from the physical buffer location prior to writing the data in the data packet received in step 500 to the physical buffer location. Alternatively, any data that is present in the physical buffer location is overwritten with the data in the data packet received in step 500.

In one embodiment of the technology, when the process arrives at step 520 via steps 504-508 and 516, any data that is present in the physical buffer location is removed from the physical buffer location prior to writing the data in the data packet received in step 500 to the physical buffer location. Alternatively, any data that is present in the physical buffer location is overwritten with the data in the data packet received in step 500.

In one embodiment of the technology, when the process arrives at step 520 via step 518, writing the data to the physical buffer location includes storing the data received in the data packet in step 500 and not removing or overwriting any other data that is present in the physical buffer location.

Continuing with the discussion of FIG. 5, in step 522, when the temporary buffer binding is not valid, the control module generates and issues a resend notification to the client, where the resend notification informs the client that the write (or write operation) that the client previously initiated has failed and that the client needs to reattempt the write (or write operation).

In step 524, the temporary buffer binding identified in step 502 is removed from the translation table. The process then ends. In one embodiment of the technology, a temporary buffer binding may also be removed from the translation table if the connection (via the fabric) between the client and control module is broken or otherwise disrupted.

The process shown in FIG. 5 may be performed each time a data packet is received by the storage module controller. Further, each of the physical buffer location may concurrently store data received via different data packet associated with the same virtual address.

Figure 6:
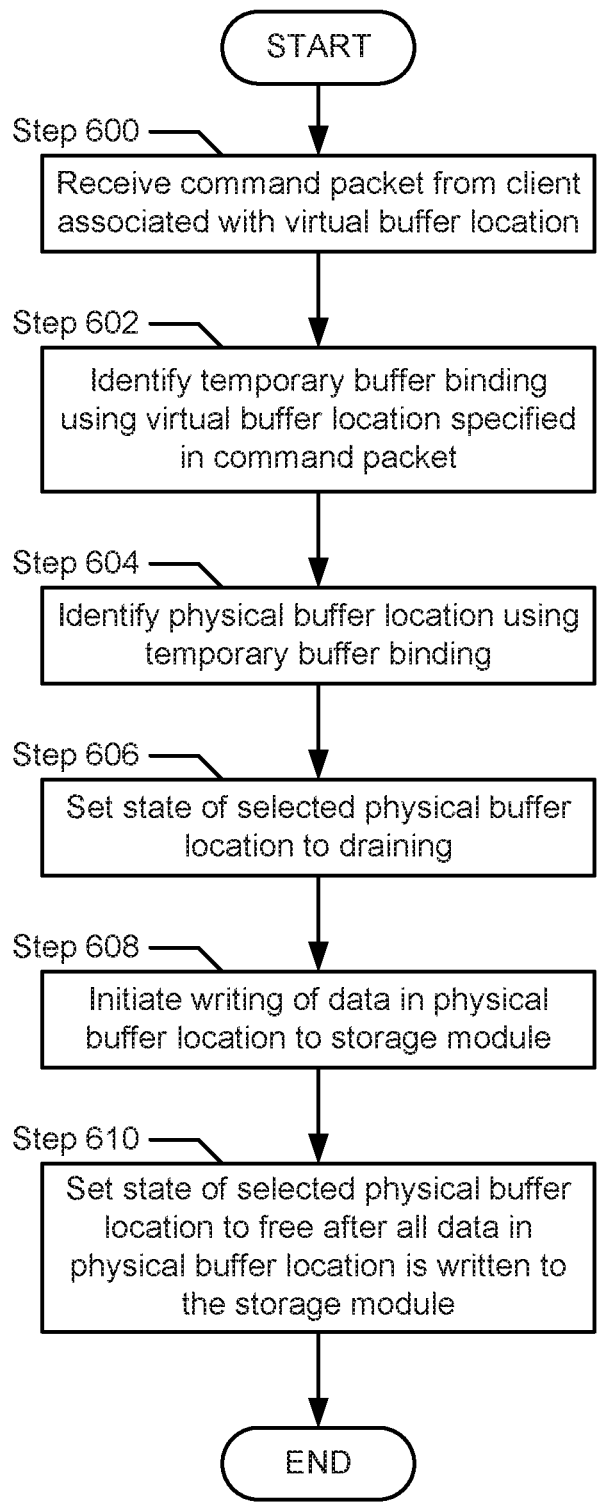

FIG. 6 shows a method for processing a write command received by the storage module controller in accordance with one or more embodiments of the technology.

In Step 600, a command packet that includes a write command and a virtual address (or other information that identifies a virtual buffer location) is received.

In Step 602, the temporary buffer binding associated with the virtual address (or with the other information that identifies a virtual buffer location) is identified. Step 602 may be performed, for example, using the translation table.

In Step 604, information, e.g., the physical address, of the physical buffer location specified in the identified temporary buffer binding is obtained.

In Step 606, the state of the physical buffer location (as determined by the information about in step 604) is updated to draining. The aforementioned state transition may be tracked by the buffer table.

In Step 608, the storage module controller initiates the writing of the data stored in the above identified physical buffer location to a storage module. The storage module to which the data is written may selected using any known or later discovered mechanism without departing from the technology.

In Step 610, after all data that was stored in the physical buffer location has been written to the storage module, the state of the physical buffer location (as determined by the information obtained in step 604) is updated to free. The aforementioned state transition may be tracked by the buffer table.

Example Use Case

The use case scenario described below is intended to provide an example of the various embodiments of the technology. The technology is not limited to the following use case scenario. More specifically, one skilled in the art will recognize that the methods described in FIGS. 3-6 are not limited to the use case scenario described below, but rather are universally applicable to a wide range of storage appliances of different configuration, complexity and size.

Figure 7A:
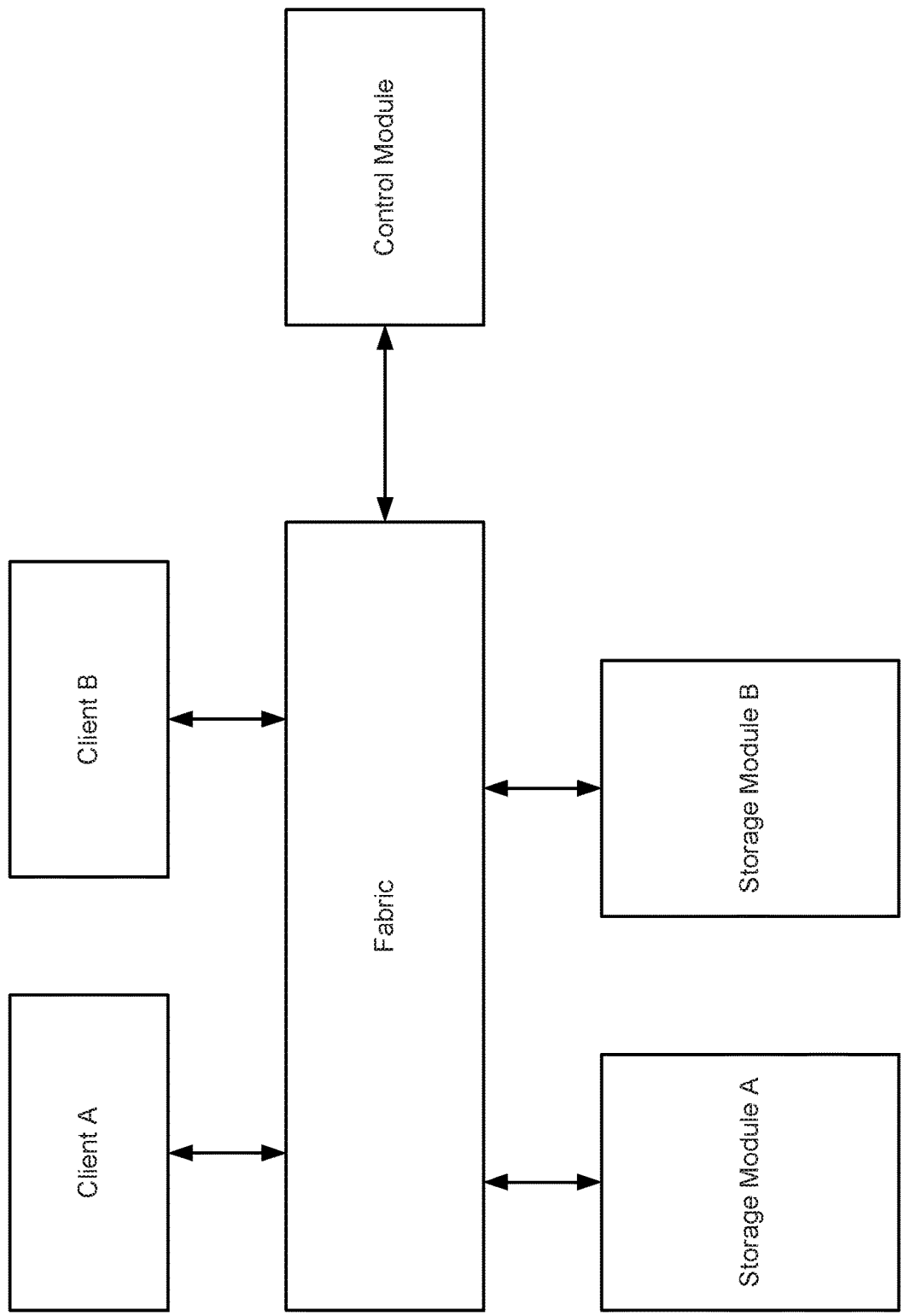
FIGS. 7A-7D shows an example in accordance with one or more embodiments of the technology.

Referring to FIG. 7A, consider a scenario in which there are two clients (client A, client B) operatively connected to a control module and two storage modules (storage module A, storage module B) via a fabric. Further, storage module A includes a 4 GB physical buffer pool (i.e., physical buffer pool in FIG. 7B). At some point in time, the control module assigns each client a private endpoint for communication with storage module A, which may be referred to as virtual function. The virtual function provides the client with the resources necessary for communication, including the virtual buffer pool. In this example, the virtual function for client A specifies a 3 GB virtual buffer pool (i.e., virtual buffer pool A in FIG. 7B) and the virtual function for client B specifies a 3 GB virtual buffer pool (i.e., virtual buffer pool B in FIG. 7B).

Figure 7B:
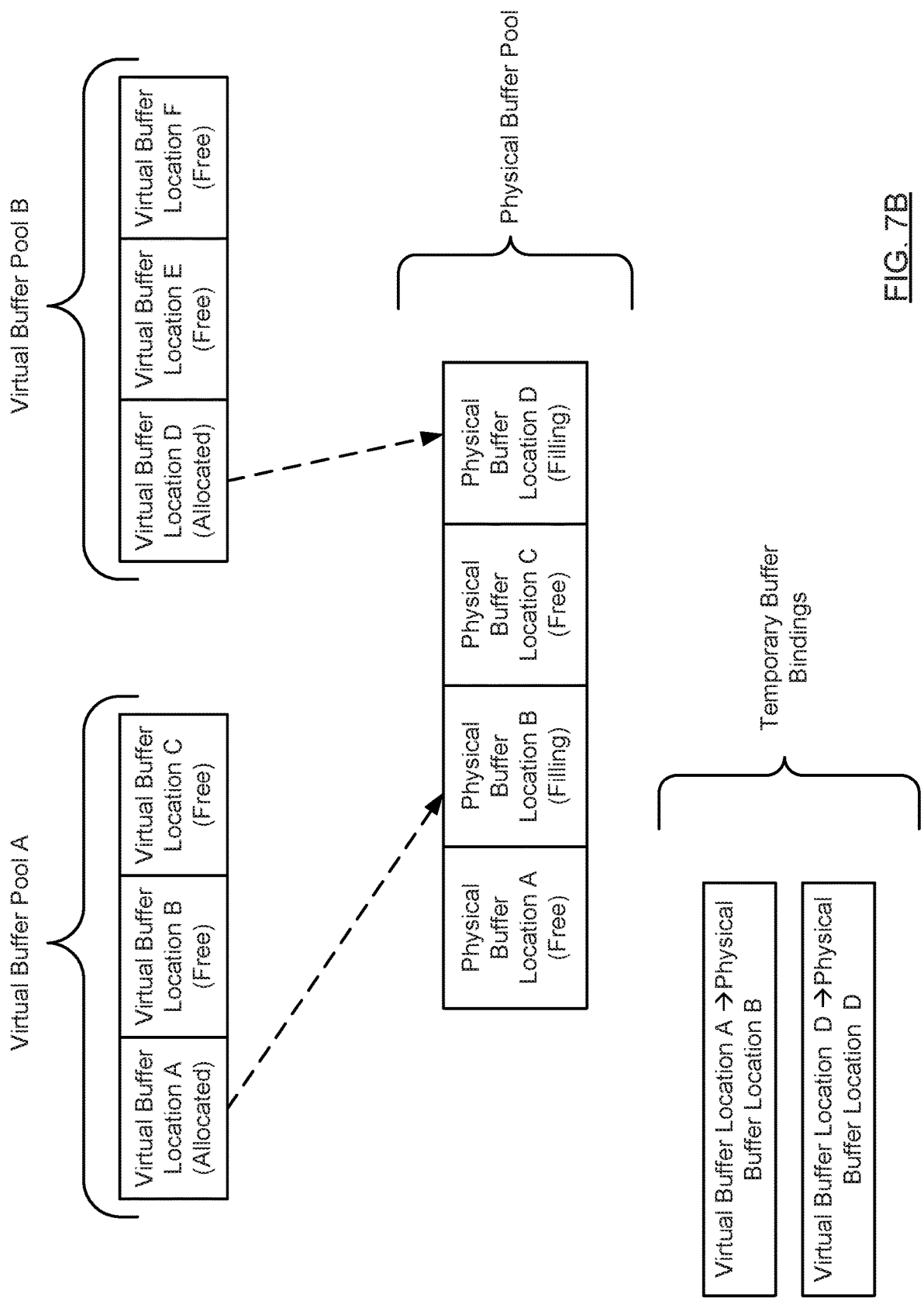

Referring to FIG. 7B, after receiving the virtual function from the control module, client A selects virtual buffer location A and then generates data packet A that includes data to be written to this buffer location and virtual address A corresponding to virtual buffer location A. As discussed above, the virtual address may be generated using the virtual function provided by the control module. Once data packet A has been generated, it is provided to the fabric. Upon receipt by the fabric, data packet A is routed through the fabric to the storage module controller. Upon receipt of data packet A, the storage module controller processes data packet A in accordance with FIG. 5. More specifically, the storage module controller selects physical buffer location B from the physical buffer pool, generates a temporary buffer binding between virtual address A and physical address B (corresponding to physical buffer location B), updates the state of physical buffer location B to filling, and then stores the data in data packet A in physical buffer location B.

After receiving the virtual function from the control module, client B selects virtual buffer location D and then generates data packet B that includes data to be written to this buffer location and virtual address D corresponding to virtual buffer location D. As discussed above, the virtual address may be generated using the virtual function provided by the control module. Once data packet B has been generated, it is provided to the fabric. Upon receipt by the fabric, data packet B is routed through the fabric to the storage module controller. Upon receipt of data packet B, the storage module controller processes data packet B in accordance with FIG. 5. More specifically, the storage module controller selects physical buffer location D from the physical buffer pool, generates a temporary buffer binding between virtual address D and physical address D (corresponding to physical buffer location D), updates the state of physical buffer location D to filling, and then stores the data in data packet B into physical buffer location D.

Figure 7C:
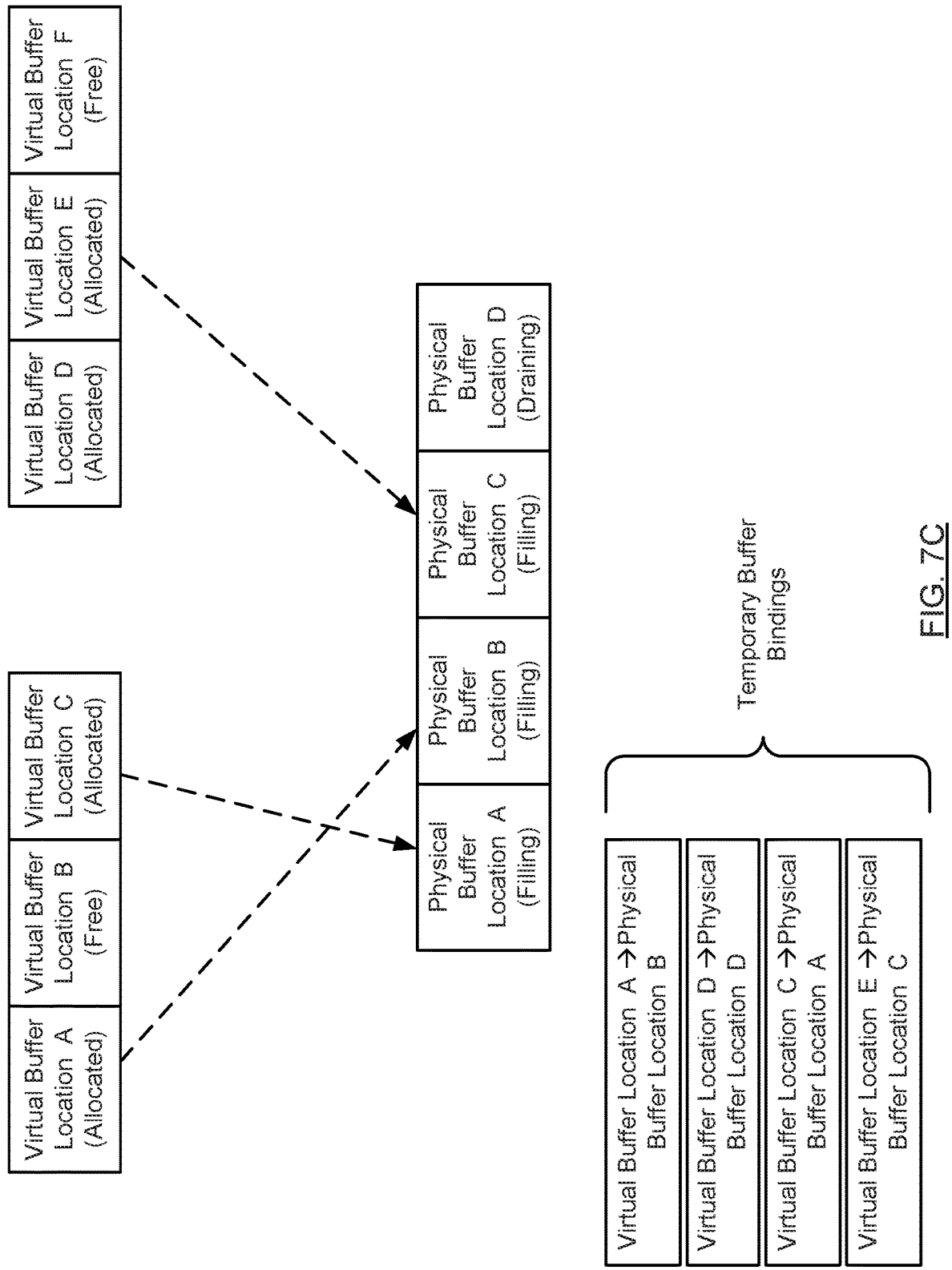

Referring to FIG. 7C, at some later point in time after data packet A and data packet B have been received and processed by the storage module controller, client B selects virtual buffer location E and then generates data packet C that includes data to be written to this buffer location and virtual address E corresponding to virtual buffer location E. As discussed above, the virtual address may be generated using the virtual function provided by the control module. Once data packet C has been generated, it is provided to the fabric. Upon receipt by the fabric, data packet C is routed through the fabric to the storage module controller. Upon receipt of data packet C, the storage module controller processes data packet C in accordance with FIG. 5. More specifically, the storage module controller selects physical buffer location C from the physical buffer pool, generates a temporary buffer binding between virtual address E and physical address C (corresponding to physical buffer location C), updates the state of physical buffer location C to filling, and then stores the data in data packet B into physical buffer location C.

Further, Client A selects virtual buffer location C and then generates data packet D that includes data to be written to this buffer location and virtual address C corresponding to virtual buffer location C. As discussed above, the virtual address may be generated using the virtual function provided by the control module. Once data packet D has been generated, it is provided to the fabric. Upon receipt by the fabric, data packet D is routed through the fabric to the storage module controller. Upon receipt of data packet D, the storage module controller processes data packet D in accordance with FIG. 5. More specifically, the storage module controller selects physical buffer location A from the physical buffer pool, generates a temporary buffer binding between virtual address C and physical address A (corresponding to physical buffer location A), updates the state of physical buffer location A to filling, and then stores the data in data packet C in physical buffer location A.

In addition, client B, after sending all data packets associated with the write request to virtual address B, generates a command packet that includes a write command and virtual address B. Once the command packet has been generated, it is provided to the fabric. Upon receipt by the fabric, the command packet is routed through the fabric to the storage module controller. Upon receipt of the command packet, the storage module controller processes the command packet in accordance with FIG. 6. More specifically, the storage module controller identifies the physical address corresponding to virtual address D using the translation table, updates the state of physical buffer location D to draining, and then initiates the writing of data currently stored in physical buffer location D to storage module A. While D physical buffer location D has a state of draining, no data additional data can be written to physical buffer location D.

Figure 7D:
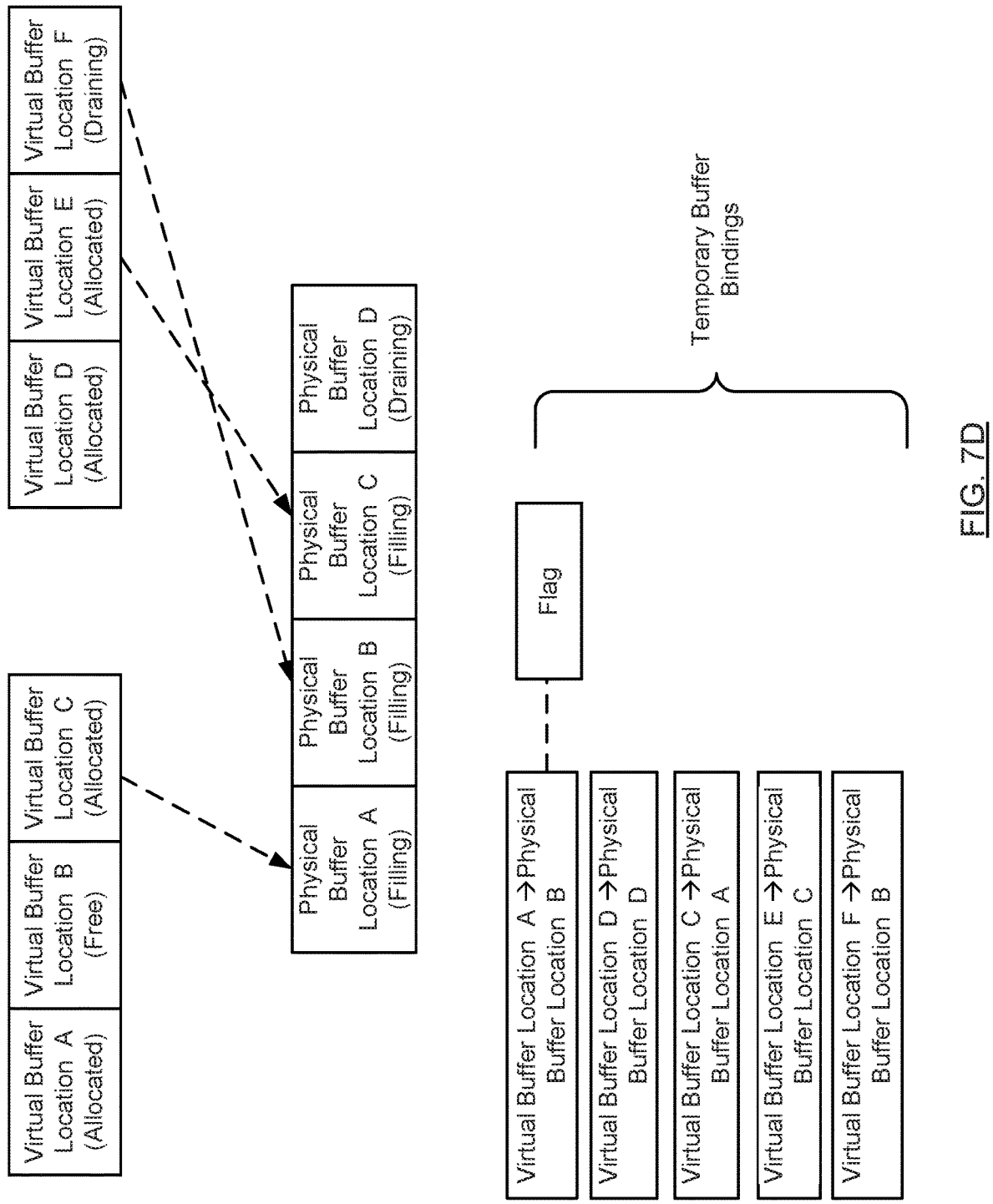

Referring to FIG. 7D, after issuing the command packet, client B selects virtual buffer location F and then generates data packet E that includes data to be written to this buffer location and virtual address F corresponding to virtual buffer location F. As discussed above, the virtual address may be generated using the virtual function provided by the control module. Once data packet E has been generated, it is provided to the fabric. Upon receipt by the fabric, data packet E is routed through the fabric to the storage module controller. Upon receipt of data packet E, the storage module controller processes data packet E in accordance with FIG. 5. More specifically, the command module attempts to locate a physical buffer location in the physical buffer pool; however, there are no physical buffer locations that have a state of free. Accordingly, the storage module controller identifies all physical buffer locations with a state of filling (i.e., physical buffer locations A, B, and C) and then subsequently selects physical buffer location B.

After this selection has been made, a flag associated with the temporary buffer binding associated with physical buffer location B is set. Further, the storage module controller generates a temporary buffer binding between virtual address F and physical address B (corresponding to physical buffer location B), sets the state of physical buffer location B to filling, and then stores the data in data packet E in physical buffer location B.

At some later point in time, the storage module controller receives a data packet or a control packet that includes virtual address A (i.e., the virtual address associated with virtual buffer location A) from client A. Upon receipt of such a data packet or command packet, the storage module controller (in accordance with FIG. 5) determines that a flag is set for the temporary buffer binding associated with virtual buffer location A. Based on this determination, the storage module controller issues a resend notification to client A and removes that aforementioned temporary buffer binding from the translation table (not shown) in the storage module controller.

Client A, upon receipt of the resend notification, may reissue the write request that it has initially issued to virtual buffer location A. The aforementioned write request may be reissued to any available virtual buffer location that has been allocated to client A.

Finally, once all data in physical buffer location D has been stored in storage module A, the state of physical buffer location D is transitioned to free.

Software instructions in the form of computer readable program code to perform embodiments of the technology may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform embodiments of the technology.

While the technology has been described with respect to a limited number of embodiments, those skilled in the art, having benefit of this disclosure, will appreciate that other embodiments can be devised which do not depart from the scope of the technology as disclosed herein. Accordingly, the scope of the technology should be limited only by the attached claims.

What is claimed is:

1. A method for writing data to a storage appliance, comprising:
    receiving a first data packet from a first client, comprising a first virtual address for a first virtual buffer in a first virtual buffer pool, and data;
    making a first determination that the first virtual buffer is not associated with any buffer binding in a translation table;
    making a second determination, based on the first determination, that no physical buffer in a physical buffer pool has a state of free;
    identifying, based on the second determination, a set of filling physical buffers in the physical buffer pool, wherein each physical buffer of the set of filling physical buffers has a state of filling;
    selecting, from the set of filling physical buffers, a first physical buffer based on a selection criterion;
    setting, after selecting the first physical buffer, a flag for a previous buffer binding in the translation table, wherein the previous buffer binding is associated with the first physical buffer;
    generating, after setting the flag, a new buffer binding that associates the first virtual buffer and the first physical buffer; and
    writing, after generating the new buffer binding, the data to the first physical buffer.

2. The method of claim 1, wherein the flag indicates that the previous buffer binding is invalid.

3. The method of claim 2, wherein the previous buffer binding associates the first physical buffer with a second virtual buffer, wherein the second virtual buffer belongs to a second virtual buffer pool.

4. The method of claim 3, wherein writing the data to the first physical buffer comprises:
    overwriting existing data received from a second client associated with the second virtual buffer pool.

5. The method of claim 3, wherein after writing the data, the method further comprises:

receiving a second data packet from a second client, comprising a second virtual address for the second virtual buffer in the second virtual buffer pool;

making a third determination, based on the second virtual address, that the previous buffer binding is indicated in an entry in the translation table;

making a fourth determination that the entry is associated with the flag; and issuing, based on the fourth determination, a resend notification to the second client.

6. The method of claim 5, wherein after issuing the resend notification, the method further comprises:

deleting the entry from the translation table.

7. The method of claim 1, wherein the selection criterion indicates that the previous buffer binding is the oldest buffer binding in the translation table.

8. The method of claim 1, wherein the selection criterion indicates that the previous buffer binding is associated with a second client that has a lower negotiated quality of service (QoS) relative to the first client.

9. The method of claim 1, wherein generating the new buffer binding comprises:

creating a new entry in the translation table that indicates the first virtual buffer and the first physical buffer are associated.

10. The method of claim 1, wherein there are more virtual buffers than there are physical buffers.

11. A storage appliance comprising:

a fabric;

a storage module controller comprising a first physical buffer pool, operatively connected to the fabric, and configured to:

receive a first data packet from a first client, comprising a first virtual address for a first virtual buffer in a first virtual buffer pool, and data;

make a first determination that the first virtual buffer is not associated with any buffer binding in a translation table;

make a second determination, based on the first determination, that no physical buffer in a physical buffer pool has a state of free;

identify, based on the second determination, a set of filling physical buffers in the physical buffer pool, wherein each physical buffer of the set of filling physical buffers has a state of filling;

select, from the set of filling physical buffers, a first physical buffer based on a selection criterion;

set, after selecting the first physical buffer, a flag for a previous buffer binding in the translation table, wherein the previous buffer binding is associated with the first physical buffer;

generate, after setting the flag, a new buffer binding that associates the first virtual buffer and the first physical buffer; and write, after generating the new buffer binding, the data to the first physical buffer.

12. The storage appliance of claim 11, wherein the flag indicates that the previous buffer binding is invalid.

13. The storage appliance of claim 12, wherein the previous buffer binding associates the first physical buffer with a second virtual buffer, wherein the second virtual buffer belongs to a second virtual buffer pool.

14. The storage appliance of claim 13, wherein writing the data to the first physical buffer comprises:

overwriting existing data received from a second client associated with the second virtual buffer pool.

15. The storage appliance of claim 13, wherein after writing the data, the storage module controller is further configured to:

receive a second data packet from a second client, comprising:

a second virtual address for the second virtual buffer in the second virtual buffer pool;

make a third determination, based on the second virtual address, that the previous buffer binding is indicated in an entry in the translation table;

make a fourth determination, based on the entry, that the flag exists; and issue, based on the fourth determination, a resend notification to the second client.

16. The storage appliance of claim 15, wherein after issuing the resend notification, the storage module controller is further configured to:

delete the entry from the translation table.

17. The storage appliance of claim 11, wherein the selection criterion indicates that the previous buffer binding is the oldest buffer binding in the translation table.

18. The storage appliance of claim 11, wherein the selection criterion indicates that the previous buffer binding is associated with a second client that has a lower negotiated quality of service (QoS) relative to the first client.

19. The storage appliance of claim 11, wherein generating the new buffer binding comprises:

creating a new entry in the translation table that indicates the first virtual buffer and the first physical buffer are associated.

20. The storage appliance of claim 11, wherein there are more virtual buffers than there are physical buffers.

* * * * *